May 16, 1950 R. H. BAILEY 2,508,087
DREDGE
Filed Dec. 21, 1945 9 Sheets-Sheet 1
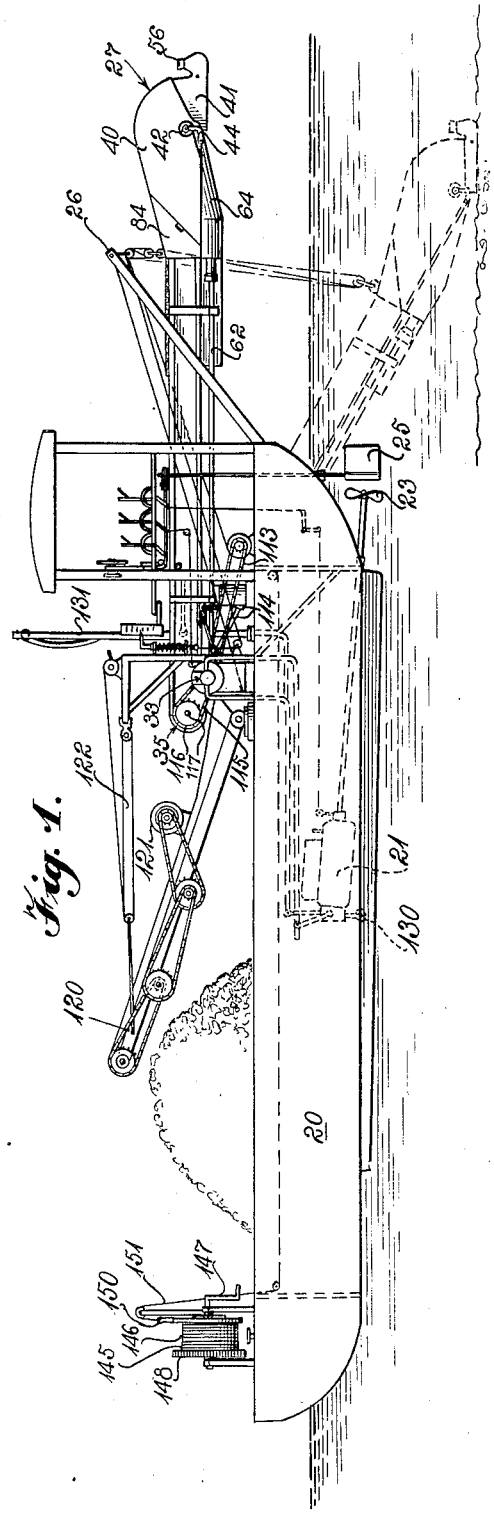
INVENTOR
Rupert H. Bailey
BY
Stevens and Davis
ATTORNEYS May 16, 1950 R. H. BAILEY 2,508,087
DREDGE
Filed Dec. 21, 1945 9 Sheets-Sheet 2
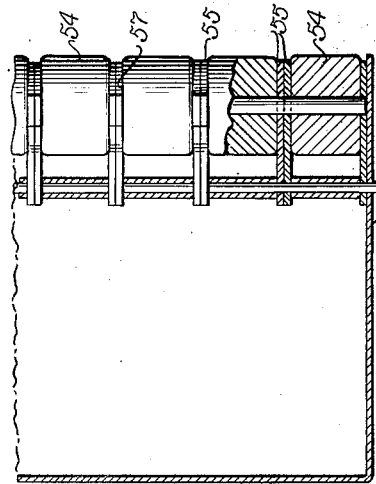
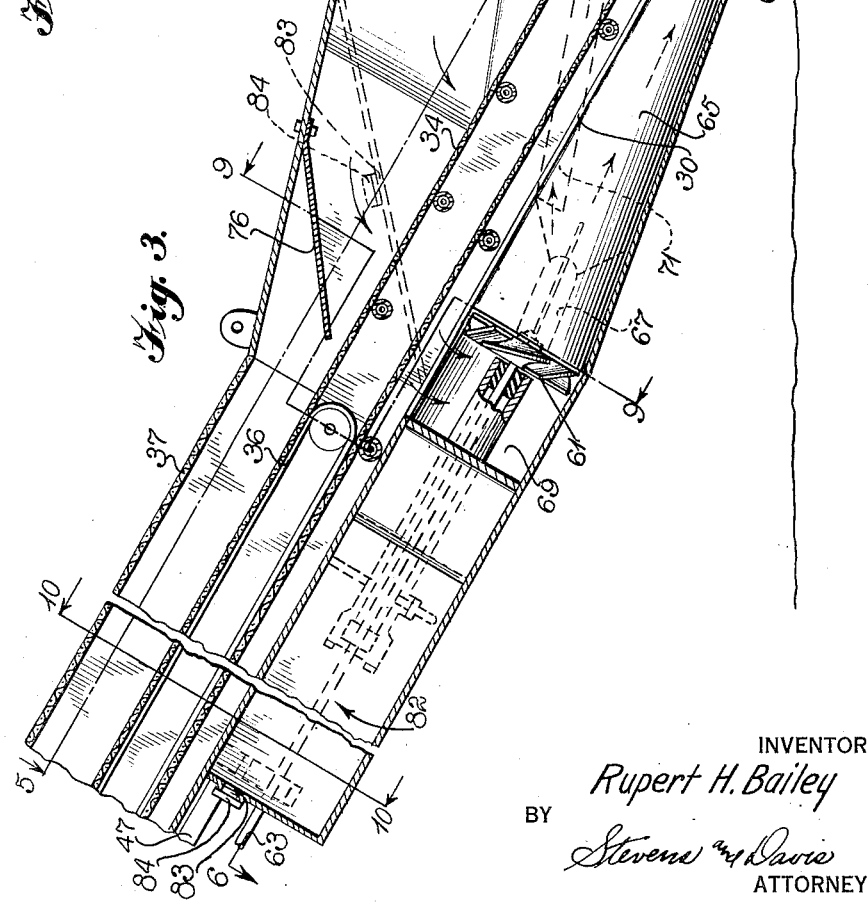
INVENTOR
Rupert H. Bailey
BY
Stevens and Davis
ATTORNEYS

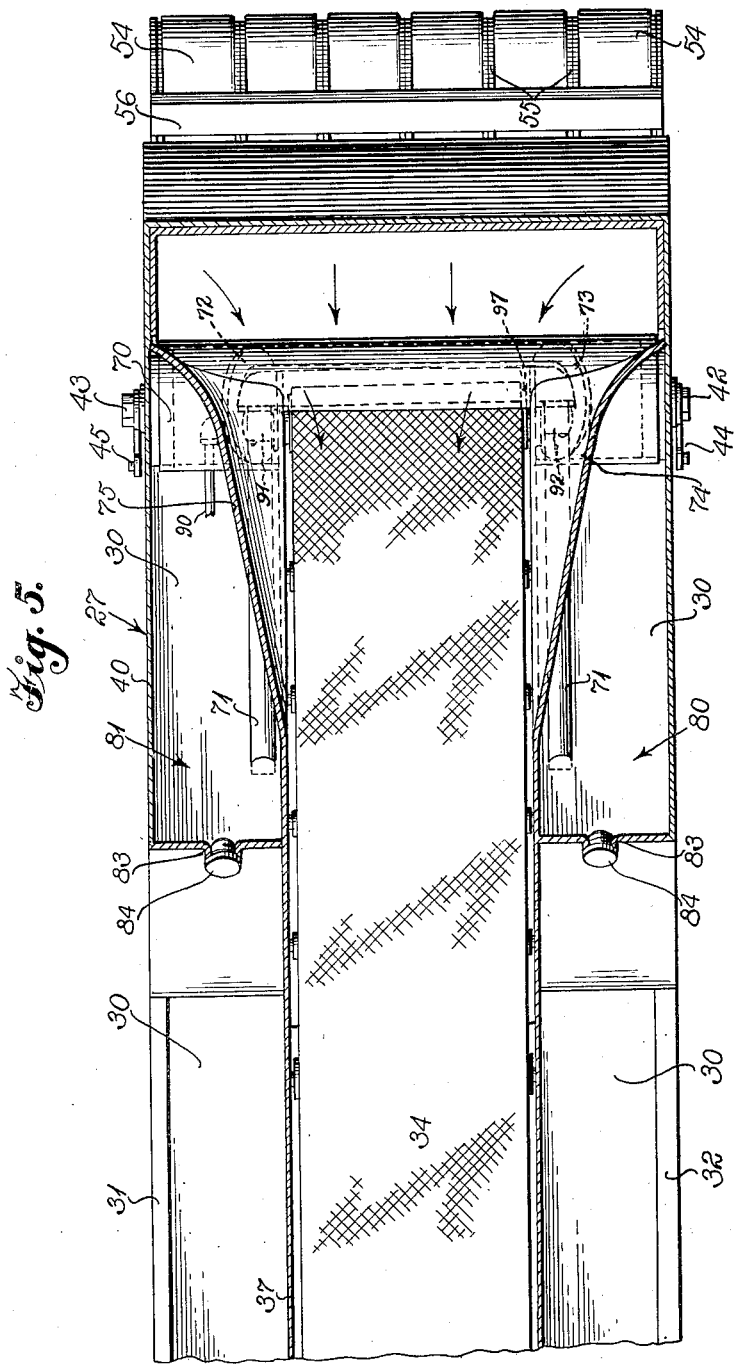

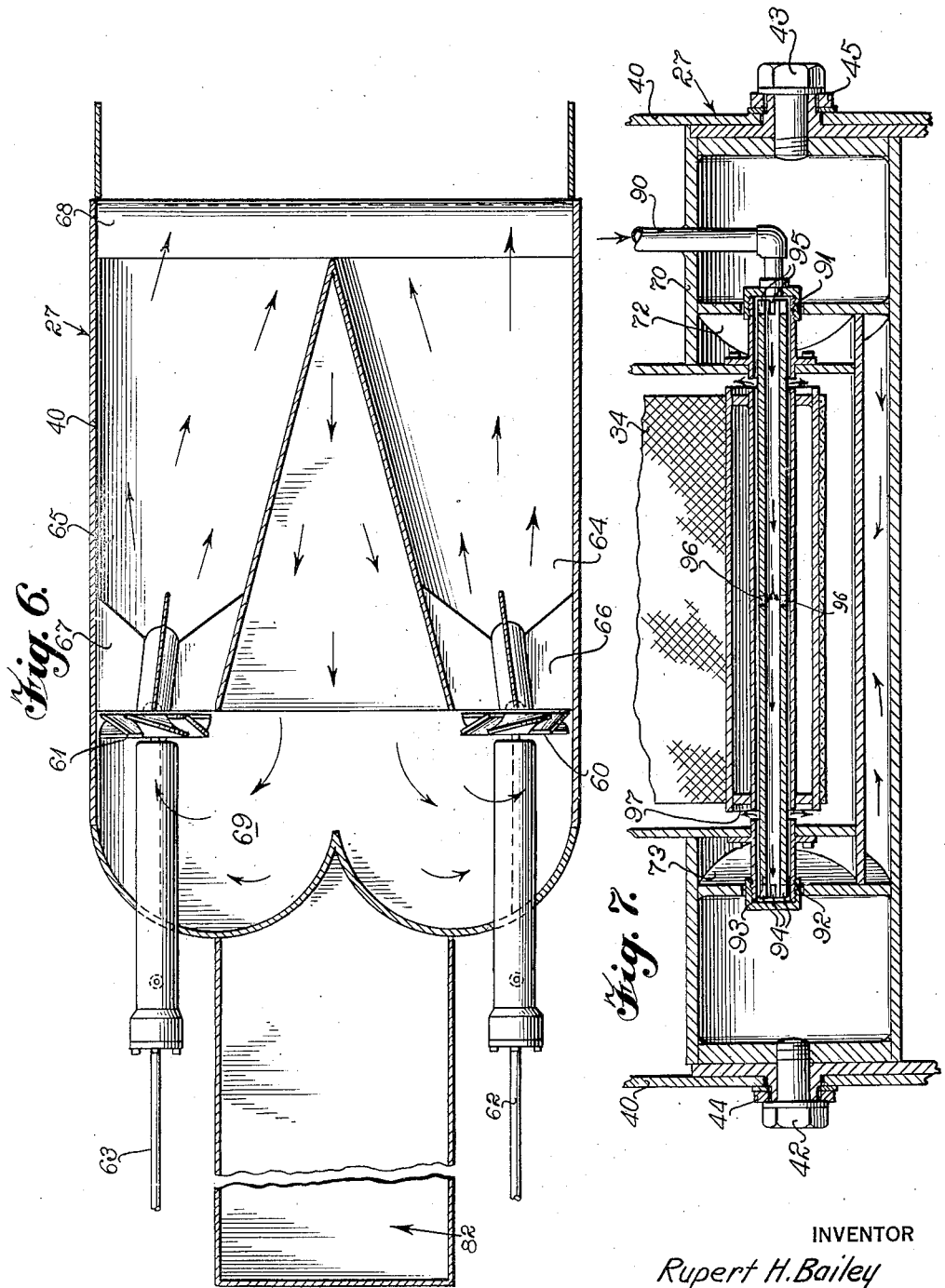

May 16, 1950     R. H. BAILEY     2,508,087
DREDGE
Filed Dec. 21, 1945            9 Sheets-Sheet 5
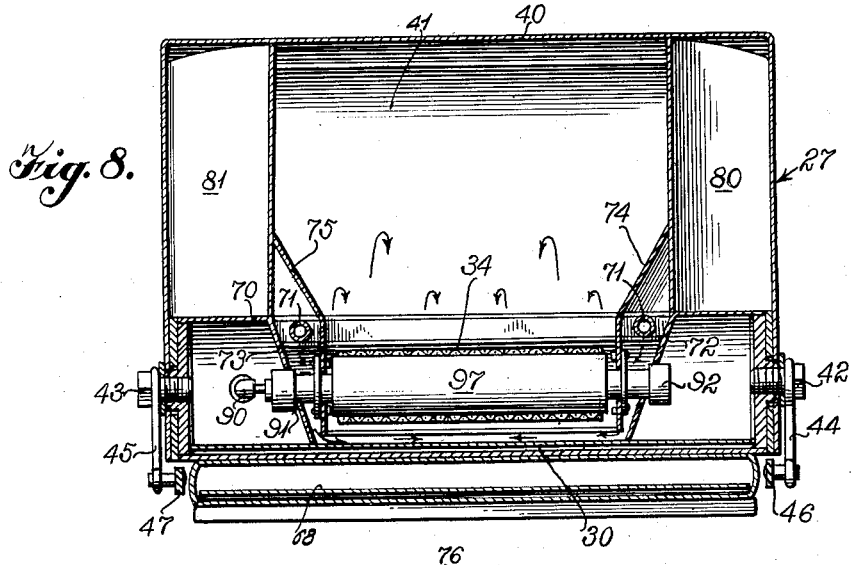
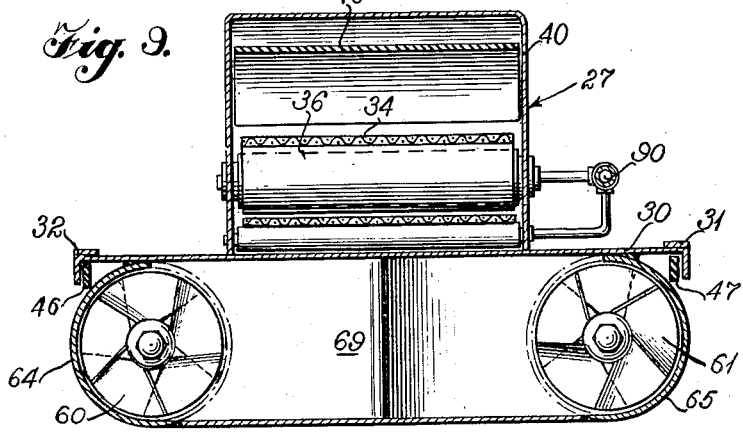
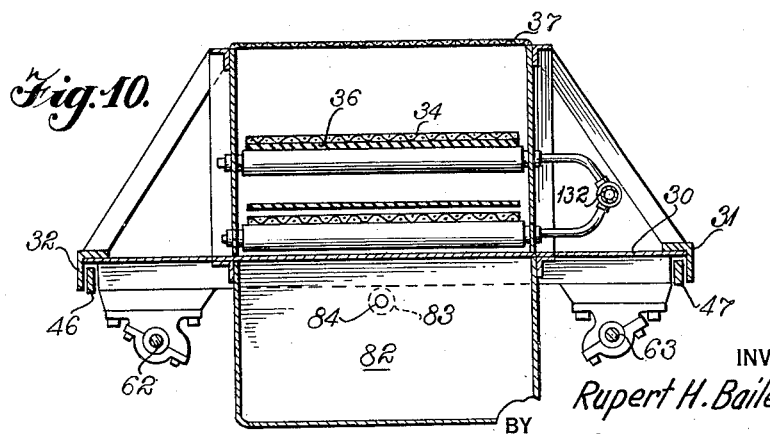
INVENTOR
Rupert H. Bailey
BY
Stevens and Davis
ATTORNEYS May 16, 1950 R. H. BAILEY 2,508,087
DREDGE
Filed Dec. 21, 1945 9 Sheets-Sheet 6
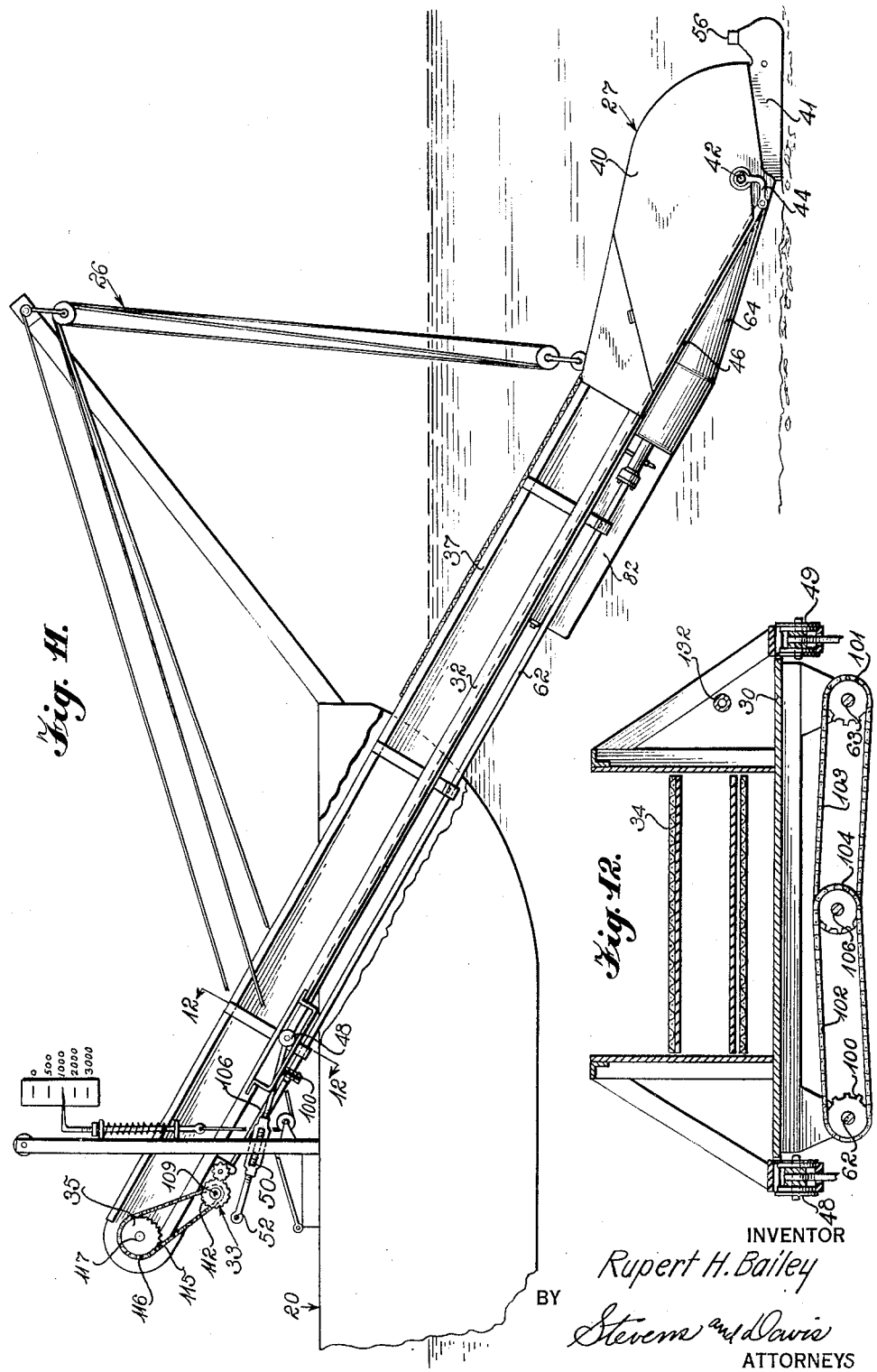
INVENTOR
Rupert H. Bailey
BY
Stevens and Davis
ATTORNEYS May 16, 1950 R. H. BAILEY 2,508,087
DREDGE
Filed Dec. 21, 1945 9 Sheets-Sheet 7
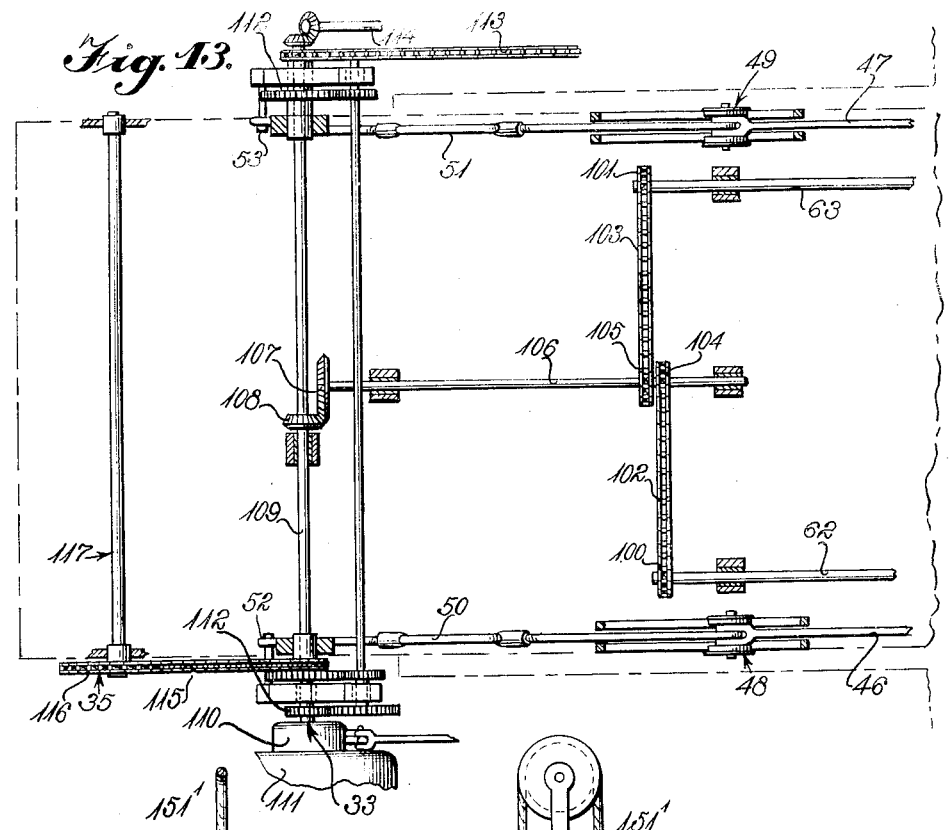
Fig. 13.
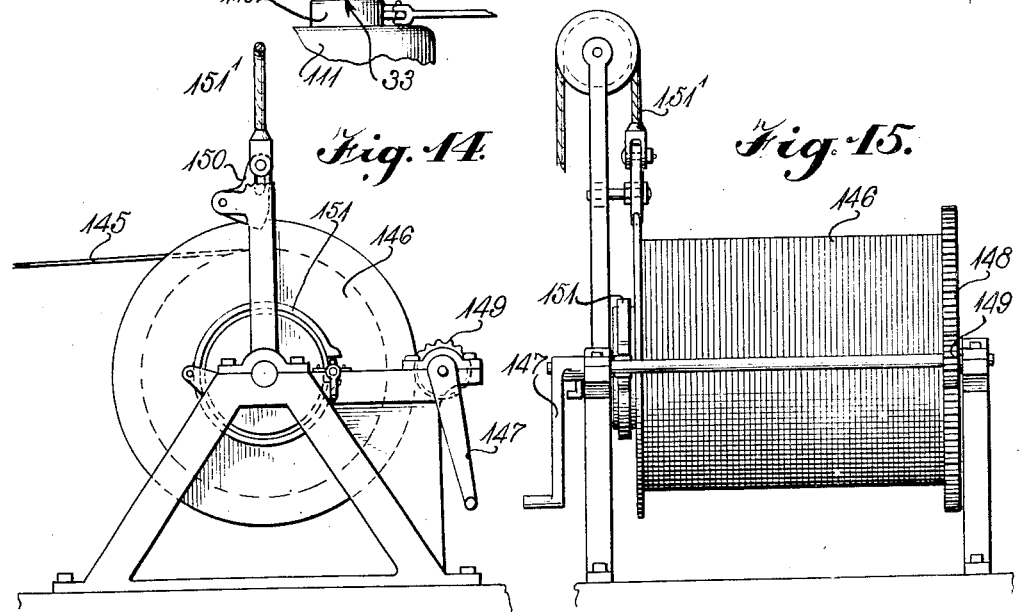
Fig. 14.
Fig. 15.
INVENTOR
Rupert H. Bailey
BY
Stevens and Davis
ATTORNEYS May 16, 1950 R. H. BAILEY 2,508,087
DREDGE
Filed Dec. 21, 1945 9 Sheets-Sheet 8
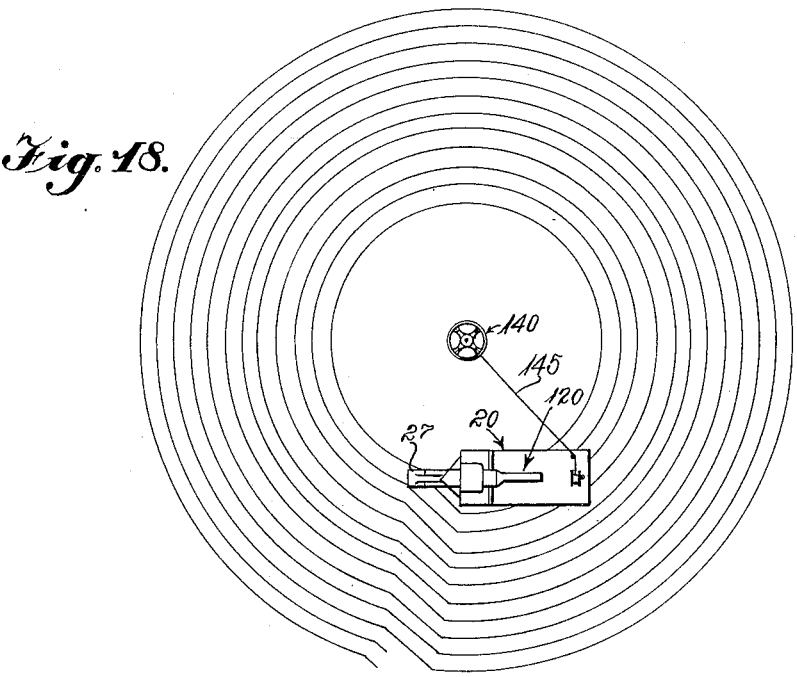
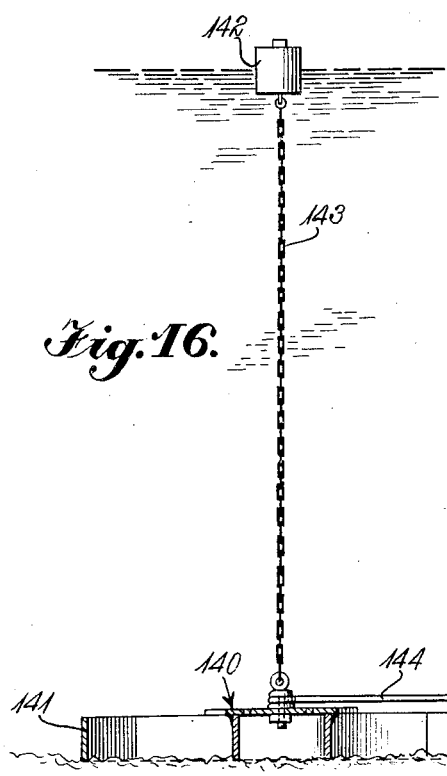
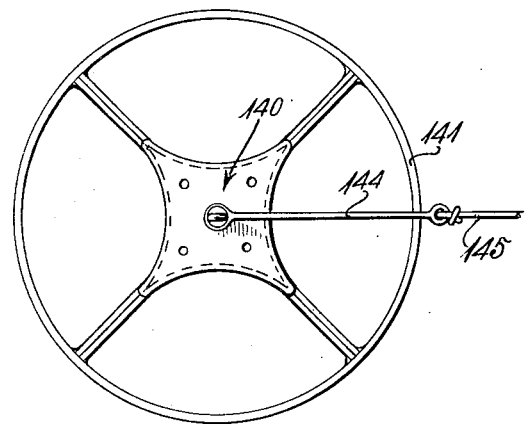
INVENTOR
Rupert H. Bailey
BY
Stevens and Davis
ATTORNEYS May 16, 1950 R. H. BAILEY 2,508,087
DREDGE
Filed Dec. 21, 1945 9 Sheets-Sheet 9
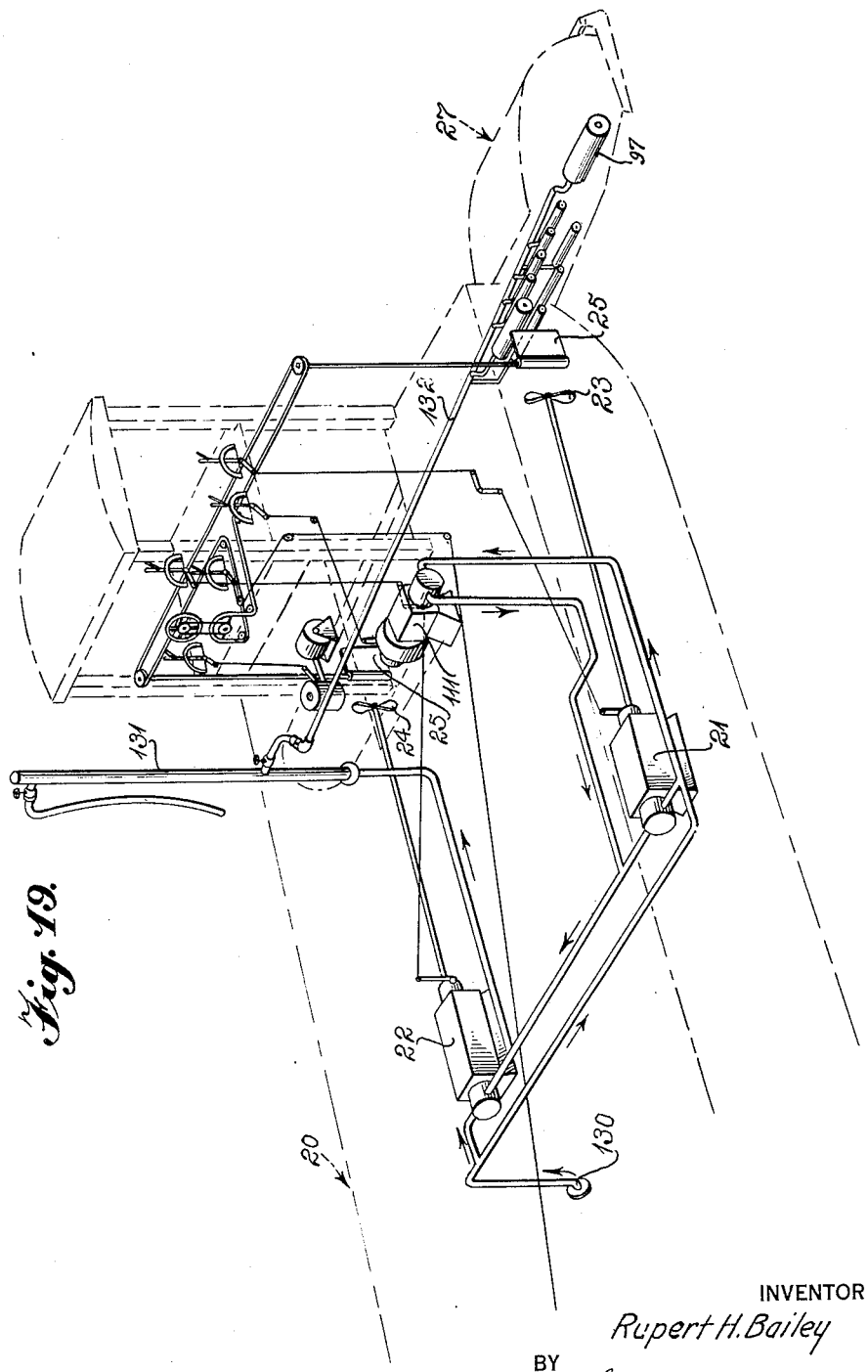

Patented May 16, 1950

2,508,087

UNITED STATES PATENT OFFICE 2,508,087

DREDGE

Rupert H. Bailey, Seattle, Wash.

Application December 21, 1945, Serial No. 636,333

6 Claims. (Cl. 37—55)

This invention relates to dredges and more particularly to an improved semi-hydraulic dredge, especially suitable for harvesting oysters.

In the usual type of hydraulic dredge, the solid material forming the bottom is dislodged by a stream of water under high pressure and elevated to the surface. The power required for such dredging is quite high, relative to the results produced, particularly when only a small portion of what is to be dislodged from the bottom is desired at the surface. Thus, if oysters are to be harvested by one of the previously known types of hydraulic dredge, it is necessary to raise to the surface a relatively tremendous quantity of material, most of which is only to be subsequently discarded. This not only takes a large amount of power but results in great damage to the oyster bed itself.

As distinguished from the action of the ordinary type of hydraulic dredge, the present type of dredge dislodges the oysters from the bed by a relatively gentle flow of water, deposits the oysters on a screen conveyor which carries them to the surface and permits the unwanted sand, small gravel, and silt to return to its normal place on the bottom. Even seed oysters are permitted to return without being appreciably disturbed, thus permitting the bed to continue to function and produce oysters, despite the fact that it is occasionally dredged to remove the grown oysters.

While the invention is mainly directed to a dredge for dredging oysters, the dredge of this invention can also be used to remove gravel, in a washed condition, without removing sand and silt at the same time, or to remove any other relatively large objects, without at the same time removing the great quantity of smaller material with which it is normally mixed on the bottom.

In order to expedite dredging with the new dredge, means are further provided to guide the new dredge in a regular pattern about any given point so that any given area will be regularly and systematically dredged without the great amount of crisscrossing and overlapping that is usual in a dredging operation, and without permitting the dredge to miss or skip any areas.

For a detailed understanding of this invention, reference may be had to the appended drawings and the following detailed description of the specific embodiments of this invention shown therein.

In the drawings:

Figure 1 is a side elevation of the preferred form of dredge according to this invention;

Figure 2 is a plan view of the same dredge;

Figure 3 is a sectional view of the part of the dredge that removes the material to be dredged from the bottom, filters out the oysters or other objects to be recovered and sends them to the surface on a conveyor;

Figure 4 is a cross-sectional view of the structure shown in Figure 3 taken on line 4—4 of Figure 3;

Figure 5 is a cross-sectional view of the structure shown in Figure 3 taken on line 5—5 of Figure 3;

Figure 6 is a cross-sectional view of the structure shown in Figure 3 taken on line 6—6 of Figure 3;

Figure 7 is a cross-sectional view of the structure shown in Figure 3 taken on line 7—7 of Figure 3;

Figure 8 is a cross-sectional view of the structure shown in Figure 3 taken on line 8—8 of Figure 3;

Figure 9 is a cross-sectional view of the structure shown in Figure 3 taken on line 9—9 of Figure 3;

Figure 10 is a cross-sectional view of the structure shown in Figure 3 taken on line 10—10 of Figure 3;

Figure 11 is a detail view of one end of the hydraulic dredge arrangement shown in Figure 1 but with certain parts omitted to more clearly illustrate the operation of the dredge;

Figure 12 is a sectional view taken on line 12—12 of Figure 11;

Figure 13 is a detail view partly in section showing the driving connections from the source of power to the shafts which carry power to the pumps and to the chain which operates the hoist for lifting the dredging head;

Figure 14 is an end view of the winch which is used in positioning the dredging barge relative to an anchor;

Figure 15 is a side view of the same winch;

Figure 16 is a side view partly in section of an anchor-buoy arrangement to which the barge is secured, and about which it rotates during operation;

Figure 17 is a plan view of the anchor of Figure 15;

Figure 18 is a diagrammatic illustration of the manner of operating the barge about a fixed point to efficiently cover the bottom being dredged;

Figure 19 is a diagrammatic illustration of certain parts of the construction shown in Figure 1, with certain other parts omitted so as to more clearly illustrate the operation of the device.

As illustrated, the dredge of this invention is mounted on a barge 20, powered by a pair of engines 21 and 22, which motors operate propellers 23 and 24 in the conventional manner. Steering may be accomplished by controlling the relative speeds of the two propellers. Rudders 25 are also provided to facilitate the steering.

Mounted on one end of the barge 20 is a hoist 26 which supports the outboard end of the dredge 27. The inboard end of the dredge 27 is pivotally supported on the barge itself and the barge is cut away so as to form a large slot in one end through which the dredge may extend when it is in a lowered position.

The dredge itself can best be described by considering it to be built upon a long base plate 30, which extends from a point near the bottom, when the dredge is in operation, well up into the barge into which the dredge discharges. A side or edge view of this base plate may be seen in Figure 3, sectional views in Figures 8, 9, 10 and 12 and a partial top view in Figure 5. The edges of this plate may be reinforced by angle iron members 31 and 32. Near its upper end the plate 30 is pivotally supported, at point 33, on the barge. This connection is such as will permit the head of the dredge to be raised to compensate for differences in the depth of the water where the dredging is to be done. The lower end of the base plate 30 is supported by the hoist 26 which is attached to a hood member which is in turn attached to the plate 30.

Mounted on the base plate 30 and extending substantially the entire length thereof is a continuous belt conveyor 34, the belt of which is of coarse screen wire or some other similar perforated material. This conveyor may be driven by any suitable power connection to a sprocket 35 which is keyed to the shaft supporting the roller at the upper end of the conveyor.

Since it is only desired that the conveyor belt act as a screen near its lower end, the upper part of the conveyor belt may be protected from the supporting rollers, and seepage through it prevented by providing a second conveyor belt 36 so placed that it will lie between the perforated conveyor belt and the rollers during the upper part of the travel of the perforated conveyor belt, but will not extend into the lower end of the perforated conveyor belt. This second conveyor belt may be of canvas or some other solid, and preferably softer material.

Suitable housing 37 may be mounted on the base plate 30 so as to surround the upper portion of the conveyor and prevent objects being carried to the surface from being washed off of the conveyor belt.

At the lower end of the base plate 30 and the conveyor 34, an arrangement is provided whereby material from the bottom, including the objects to be recovered, is picked up by a relatively gentle flow of water, circulated over and through the perforated conveyor belt, so that the objects to be recovered will be strained out on the upper face of the conveyor, and the remainder returned to the bottom. The conveyor then moves the recovered objects to the surface.

To accomplish this, a hood 40 is provided, which hood encloses the lower end of the conveyor and is open to the portion of the bottom being dredged. Telescopically mounted within the hood 40 is a curtain member 41 pivotally mounted on the axis of a pair of stud bolts 42 and 43. Bosses on the curtain 41 extend through the hood 40 at this point and bell cranks 44 and 45 are keyed to the bosses outside of the hood 40.

In order to maintain the bottom edge of the curtain 41 parallel or substantially parallel to the bottom at all times, the bell cranks 44 and 45 control its position. They are in turn connected by truss rods 46 and 47, through sliding connections 48 and 49, near the upper end of the dredge, and turnbuckles 50 and 51, to a pair of fixed points 52 and 53 on the barge. The points 52 and 53 are so selected with reference to the pivot point for the upper end of the dredge that any pivoting of the dredge will cause a movement to be transmitted through the truss rods and bell cranks. This movement is such as to maintain the bottom edge of the curtain 41 in substantial parallelism with the bottom. By this arrangement, the hood 40 and the curtain 41 are caused to form, at all times, a substantially water-tight compartment around a section of the bottom end of the perforated conveyor belt.

To further assist in the maintaining of a compartment which is, for all practical purposes, water-tight, a series of small rollers 54 are mounted by means of links 55 on the forward edge of the curtain 41. These rollers can individually move up or down to follow the contours of the bottom and provide an even closer seal than would be provided by the curtain 41 alone. In order to limit the upward movement of the rollers 54 relative to the curtain 41, a crossbar 56 is provided above the rollers and connected rigidly to the curtain 41. The link members 55 are then provided with upstanding lugs 57 which will strike the crossbar 56 if any roller or rollers are raised to a sufficient extent. Thus, if the dredge is pushed over an appreciable rise the rollers through the upstanding lugs on the links 55 will raise the crossbar 56 and in turn the curtain 41, and with it the rest of the dredge head. This will prevent injury to the dredge head by the encountering of a raised place on the bottom, and in general cause the dredge head to follow the contours of the bottom.

In order to provide a flow of water sufficient to accomplish the moving of the oysters or other objects to the conveyor screen, a pair of impeller pumps 60 and 61 are mounted under the base plate 30 and driven by shafts 62 and 63 which extend to the surface. These pumps 60 and 61 preferably each comprise five partially overlapping impeller blades. As seen in Figure 6, these impeller pumps discharge into a pair of cylindrical tubes 64 and 65 which are flattened so as to form one wide flat stream at their lower or discharge ends.

To prevent swirling and obtain a smooth, even, linear flow, a series of vanes, 66 and 67, are placed in each of the tubes 64 and 65. At the discharge ends of the tubes 64 and 65 where they merge into one long flap opening, a discharge nozzle 68 is placed in the combined ends of the tubes so as to direct the stream of water against the bottom being dredged.

After striking the bottom, the water together with the material which it has removed from the bottom passes upwardly and over the top of the lower end of the conveyor and then downwardly through the conveyor leaving the objects to be recovered on the surface of the conveyor. Beneath the conveyor the base plate 30 is cut away so that water and small material which is not filtered out by the conveyor may pass through the base plate into the chamber 69 formed between the impeller pumps and behind them. From this chamber the water is withdrawn by the impeller pumps and recirculated.

In order to assist in directing the water from the nozzle 63 upwardly and onto the conveyor belt, a tubular member 70 is mounted in the hood 40 so as to partially surround the lower end of the conveyor belt. This tubular member is comprised of two cylinders, one within the other, and a certain amount of water from the impeller pumps is directed into the space between the two cylindrical members through pipes 71. This water enters the space between the two cylindrical members at a point near the top and circulates, clockwise as seen in Figure 3, around between the two cylindrical members and is released near the bottom of the two cylindrical members so as to flow upwardly along the bottom stretch of the conveyor thus preventing an accumulation of solid material at the lower end of the conveyor and assisting in the cleaning of the conveyor belt.

Since the conveyor belt is not as wide as the hood 40, baffles 72 and 73 are provided to direct the water flowing between the two cylindrical members inwardly toward the conveyor belt. Baffles 74 and 75 are also provided in the upper part of the hood 40 to cause the water that flows upwardly and over the conveyor to converge from the sides of the hood onto the conveyor. These baffles can be clearly seen in Figure 5. Another baffle 76 extends downwardly from the top of the hood 40 near its upper end to prevent water from being forced up the conveyor. See Figure 3.

In order to reduce the weight of the dredge when it is in the water, air tanks 80 and 81 are provided between the baffles 74 and 75 and the walls of the hood 40, and another air tank 82 is provided in back of the pump chambers and under the base plate 30. Access to these air tanks may be had through appropriate openings 83 which are normally closed by plugs 84. By adjusting the quantity of air in these tanks the dredge may be so balanced as to cause it to rest lightly on the bottom. Air pump connections and the necessary valves may be added to the structure shown, for accomplishing this balancing of the weight of the dredge.

In order to protect the bearings for the rollers which support the conveyor belt from damage by the sand and other fine material suspended in the water which surrounds them, these bearings are continuously lubricated and flushed by fresh water fed to them under pressure from the surface. As illustrated in Figure 7, this fresh water under pressure is provided through a pipe 90 and enters one of two fixed bearing members 91 and 92 which are fixed to the frame of the machine. Held in these bearing members 91 and 92 is a freely rotatable hollow shaft 93. This shaft is provided with a series of openings 94 and 95 near its ends, and another series of openings 96 near its center. The water entering the fixed bearing 91 thus enters the hollow center of the shaft 93 and emerges through the openings at both ends and at the center. A conveyor pulley 97 is mounted on the shaft and the water emerging from the central openings in the hollow shaft 93 passes outwardly between the pulley and the shaft, keeping the bearing surfaces between the pulley and the shaft free of sand or other fine material and at the same time providing lubrication. A certain amount of water also passes inwardly from the ends of the shaft to the inner ends of the fixed bearings 91 and 92 thus providing lubrication between the hollow shaft and the fixed bearings and at the same time flushing these bearing surfaces clear of fine material.

As illustrated in Figures 12 and 13, the pump shafts 62 and 63 are connected together at a point above the surface by sprockets 100 and 101 mounted on the shafts 62 and 63, respectively, and connected by chain drives 102 and 103, respectively, to sprockets 104 and 105, respectively, both mounted on a central shaft 106. This shaft is driven through gears 107 and 108 from a main drive shaft 109 connected by a clutch 110 to an internal combustion engine 111 or any other suitable source of power.

The hoist 26 may also be driven from the main shaft 109 of the internal combustion engine 111 through suitable gearing 112. This gearing may include a chain drive 113 to the hoist for direct drive and a shaft drive 114 for reverse drive. The details of this drive will not be further explained since they are conventional. The conveyor also may be driven from the main drive shaft 109 through the reduction gearing 112 and a chain drive 115 which connects to a sprocket 116 on a shaft 117 which supports the end pulley of the conveyor and is keyed to it or otherwise fixed to it so that the pulley must rotate with the shaft.

As can be seen in Figures 1 and 2, the objects brought to the surface by the dredge conveyor are discharged from the upper end of that conveyor onto a second belt conveyor 120 which is powered by its own motor 121 and positioned by a hand-operated winch 122. This conveyor is so arranged that it can be swung to any desired position to distribute the recovered objects as desired within the barge.

Water for the lubrication of the bearings of the main conveyor is supplied from the water pumps on the engines 21 and 22 which drive the barge and the engine 111, which drives the conveyor, winch, etc. As illustrated, these engines receive water from an inlet 130 in the hull of the barge and discharge water into a standpipe 131. From this standpipe water under pressure, and at a higher temperature than the outside water, is led to the bearings of the conveyor rollers through a pipe 132.

The rudder driving connection and the throttle connections for the various internal combustion engines are also illustrated in Figure 19, but need not be described in detail since they are conventional.

One additional feature of this invention which is particularly advantageous in that it permits the dredging of a given area efficiently and without undue overlapping or the missing of parts of the area, is the anchor and winch arrangement illustrated in Figures 16, 17 and 18. In its preferred form, this arrangement comprises a flat anchor member 140, which is generally circular in shape and has downwardly extending flanges 141 so that it will resist dragging in any direction. A marker buoy 142 may be attached by a line 143 so it can float above this anchor 141 and mark its position.

Pivotally connected to the anchor 140 is a link member 144 to which is attached a line 145 leading to the barge.

On the barge is a winch, shown in Figures 14 and 15, adapted to receive one end of the line 145. This winch includes the usual cable drum 146 geared to a hand-operated crank 147 by a large gear 148 and a small gear 149. It also includes a locking device or pawl 150 and a brake 151. The brake 151 is usually set to give a sufficient amount of drag so that the line 145 will not pay out too rapidly and the pawl 150 is connected by a line 151 to the operator's cab so that it can be released to pay out line whenever it is desired. The pawl 150 is so constructed that once it is released and the cable drum starts to revolve, it will not lock again until a complete revolution of the cable drum has taken place and a notch in the cable drum into which it locks has again reached the locking position. This permits the cable drum to be unlocked from the cab, the cable drum to make one revolution, thus paying out a given amount of line, and then locked to prevent any further amount of line from being payed out. Thus, the dredge may be operated as shown in Figure 18, first following the path of the innermost circle until the circuit has been completed. At that time, a given quantity of anchor line may be payed out and the dredge then follows the second circle from the center, and so on. This gives the dredge an even pattern over the bottom and prevents overlapping and crisscrossing and the missing of any areas.

What is claimed is:

1. A semi-hydraulic dredging machine that comprises a perforated belt conveyor extending from a point near the bottom to be dredged to a point above the surface of the water, an enclosure surrounding the lower end of the conveyor and forming a substantially water-tight seal around said lower end of said conveyor and a portion of the bottom to be dredged, and means for circulating water against said bottom to be dredged in such a manner that material from the bottom will be removed, filtered through the lower end of said conveyor, and returned to the bottom, and means to move said conveyor so as to convey objects filtered from said removed bottom, to the surface.

2. A semi-hydraulic dredge of the type described comprising means to hydraulically remove a portion of the bottom being dredged, means to convey the removed objects to the surface, a portion of said means functioning to filter objects of a predetermined size from the hydraulically removed portion of the bottom, said means to hydraulically remove a portion of the bottom being dredged including a hood forming a substantially water-tight seal around a portion of the bottom being dredged and means to circulate water in a predetermined path through said hood and against the bottom being dredged.

3. A semi-hydraulic dredge of the type described comprising means to hydraulically remove a portion of the bottom being dredged, means to convey the removed objects to the surface, a portion of said means functioning to filter objects of a predetermined size from the hydraulically removed portion of the bottom, said means to hydraulically remove a certain portion of the bottom comprising a hood forming a substantially water-tight compartment about the portion of the bottom being dredged, which hood includes a movable curtain member, articulated with respect to the body of the hood and adapted to lie adjacent the bottom and seal any opening between the body of the hood and the section of the bottom being dredged.

4. A semi-hydraulic dredge of the type described comprising means to hydraulically remove a portion of the bottom being dredged, means to convey the removed objects to the surface, a portion of said means functioning to filter objects of a predetermined size from the hydraulically removed portion of the bottom, said means to hydraulically remove a certain portion of the bottom comprising a hood forming a substantially water-tight compartment about the portion of the bottom being dredged, which hood includes a movable curtain member, articulated with respect to the body of the hood and adapted to lie adjacent the bottom and seal any opening between the body of the hood and the section of the bottom being dredged, and a series of rollers mounted along one edge of said curtain and articulated thereto and adapted to ride on the bottom being dredged so as to further seal any opening between the curtain member and the bottom being dredged.

5. A semi-hydraulic dredging machine of the type described that comprises a perforated belt conveyor extending from a point adjacent the area to be dredged to the surface of the water covering it, water-circulating means below the conveyor at a point near its lower end, means for directing the water circulated against the area to be dredged, a hood for directing the water that has been circulated against the area to be dredged in an upward direction, over the bottom end of the conveyor and downwardly through the conveyor and back to the water-circulating means, means to move the conveyor to lift material filtered from the circulating water to the surface, and a movable curtain member articulated with respect to the hood and adapted to lie adjacent the bottom and to seal any opening between the body of the hood and the section of the bottom being dredged.

6. A semi-hydraulic dredging machine of the type described that comprises a perforated belt conveyor extending from a point adjacent the area to be dredged to the surface of the water covering it, water-circulating means below the conveyor at a point near its lower end, means for directing the water circulated against the area to be dredged, a hood for directing the water that has been circulated against the area to be dredged in an upward direction, over the bottom end of the conveyor and downwardly through the conveyor and back to the water-circulating means, means to move the conveyor to lift material filtered from the circulating water to the surface, and at least one air tank attached to the mechanism to offset its weight when submerged in water, said hood forming a substantially water-tight seal around a portion of the bottom being dredged.

RUPERT H. BAILEY.

REFERENCES CITED

The following references are of record in the file of this patent:

UNITED STATES PATENTS

| Number | Name | Date |
|---|---|---|
| 318,860 | Bowers | May 26, 1885 |
| 336,807 | Hawley | Feb. 23, 1886 |
| 349,546 | Wells | Sept. 21, 1886 |
| 653,475 | Howe et al. | July 10, 1900 |
| 2,288,701 | Heden | July 7, 1942 |

FOREIGN PATENTS

| Number | Country | Date |
|---|---|---|
| 267,775 | Great Britain | Mar. 24, 1927 |
| 776,480 | France | Nov. 8, 1934 |